United States Patent
Dong

(10) Patent No.: US 10,322,346 B2
(45) Date of Patent: Jun. 18, 2019

(54) INTERACTIVE COLLECTIBLE CARD GAMES WITH DEFENSE AND OFFENCE TEAM FORMATIONS

(71) Applicant: Gooody Entertainment Co., Ltd., Shenzen, Guangdong (CN)

(72) Inventor: Xiaoyang Dong, Guangdong (CN)

(73) Assignee: Gooody Entertainment Co., Ltd., Shenzhen (CN)

( * ) Notice: Subject to any disclaimer, the term of this patent is extended or adjusted under 35 U.S.C. 154(b) by 0 days.

(21) Appl. No.: 15/493,874

(22) Filed: Apr. 21, 2017

(65) Prior Publication Data

US 2018/0296920 A1 Oct. 18, 2018

Related U.S. Application Data

(60) Provisional application No. 62/485,630, filed on Apr. 14, 2017.

(51) Int. Cl.
*A63F 13/56* (2014.01)
*A63F 13/822* (2014.01)
*A63F 13/35* (2014.01)

(52) U.S. Cl.
CPC ............ *A63F 13/56* (2014.09); *A63F 13/35* (2014.09); *A63F 13/822* (2014.09); *A63F 2300/807* (2013.01)

(58) Field of Classification Search
CPC .......... A63F 13/00; A63F 13/10; A63F 13/48; A63F 13/795; A63F 13/80; A63F 13/822; A63F 13/843; A63F 2300/5533; A63F 2300/5566; A63F 2300/60; A63F 2300/636; A63F 2300/638; A63F 2300/65; A63F 2300/807; A63F 13/56
See application file for complete search history.

(56) References Cited

U.S. PATENT DOCUMENTS 8,926,428 B1 * 1/2015 Nakayama .............. A63F 13/87
 463/31
2012/0302352 A1 * 11/2012 Ajami ..................... H04L 67/38
 463/42

OTHER PUBLICATIONS

StarCraft Game Manual, by Blizzard Entertainment, released in 1998.*

(Continued)

*Primary Examiner* — Jasson H Yoo
(74) *Attorney, Agent, or Firm* — Sheppard Mullin Richter & Hampton LLP

(57) ABSTRACT

An interactive system is built upon networked computing devices and cloud computing technologies that enables two or more players to prepare for and engage in a battle on a common battle ground. Prior to initiation of the battle, a player can select one or more stationary units and deploy them, as a defense team, in a home territory for the purpose of obstructing the movement or attack of the opponent. During the battle, the player can deploy attacking units that move without further player intervention, to attack the opponent. A garrisoning mode may be turned on by the player, allowing the player to form and organize an offense team of attacking units because they start to move on their own. The option of forming both defense teams and offense teams, which will carry out their mission without further player intervention presents an attractive gameplay strategy.

12 Claims, 13 Drawing Sheets

(56) References Cited

OTHER PUBLICATIONS

Clash Royale: YouTuber Tournament (highlights), by Clash Royale (Published on Jan 5, 2016, retrieved from https://www.youtube.com/watch?v=JK_2VrLHAcw), retrieved Aug. 13, 2018.*

Soul of Eden Tutorial, by Rayark Inc., Published on Oct. 12, 2016, retrieved from https://www.youtube.com/watch?v=QLaVsVWAlug, retrieved on Aug. 13, 2018.*

\* cited by examiner

INTERACTIVE COLLECTIBLE CARD GAMES WITH DEFENSE AND OFFENCE TEAM FORMATIONS

CROSS REFERENCE TO RELATED APPLICATIONS

This application claims the benefit under 35 U.S.C. § 119(e) of U.S. Provisional Application Ser. No. 62/485,630 Apr. 14, 2017, the content of which is incorporated by reference in its entirety into the present disclosure

BACKGROUND

Tower defense games started about thirty years ago during the arcade video games era. It typically requires a user to defend a territory or possession from enemy attacks. Alternatively, a user wins by destroying the opponent's territory or possession. Some tower defense games are real-time strategy games while others include aspects of turn-based strategy. Strategic selection and positioning of defensive elements is an important element of these games. Tower defense games saw increased popularity in the last decade due in part to the widespread use of smartphones and tablets.

SUMMARY

The present disclosure, in some embodiments, provides an interactive system built upon networked computing devices and cloud computing technologies that enables two or more players to prepare for and engage in a battle on a common battle ground. A primary goal for each of the players, in one embodiment, is to defend its home base (e.g., a castle) while attacking to destroy the opponent's home base. Prior to initiation of the battle, in some embodiments, a player can select one or more stationary units (also referred to as defensive structures) and place them on the ground of a home territory for the purpose of obstructing the movement or attack of the opponent. During the battle, the player can continuously, optionally with certain limitations, select and deploy attacking units on the battle ground. With the stationary units and the attacking units, the players will try to approach and destroy the opponent's home base and defend its own home base.

In some embodiments, a player is able to switch between two modes, a garrisoning mode and a moving mode. In the garrisoning mode, after the player deploys an attacking unit on the battle ground, the attacking unit does not start to move by itself yet, which allows the player to deploy more attacking units and, if needed, rearrange the attacking units. Once the player is ready to let the attacking units initiate the attack, the player can enter into a moving mode. In some embodiments, in the garrisoning mode, even attacking units that have been placed before the switch over to the garrisoning mode are held stationary. In some embodiments, only those newly deployed (since the start of the garrisoning mode) are held stationary while the earlier deployed ones can still move. In some embodiments, in the garrisoning mode, the attacking units can still attack or defend, albeit not changing positions on the battle ground.

In some embodiments, the stationary units and the attacking units are selected from a listing of stationary units and the attacking units available to the player. A player may be able to obtain more such stationary units and the attacking units ("collectable cards") and/or upgrade them through gameplay, with payment, or from donation. Therefore, in some embodiments, the present technology has elements of collectible card games and tower defense games, and empowers gameplay with formations of both defense and offense teams.

In various implementations, a networked computing system is configured to enable two or more players to engage in the interactive gameplay. In some embodiments, the computing system can provide a game interface through which users can place stationary units and attacking units on battle grounds. Such interfaces may include maps of the battle ground, image of home bases, paths, buttons or menus for taking user commands, without limitation. In various implementations, the technology may also provide apparatuses, modules, and computer-readable non-transitory media for implementing the technology.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Figure 1A:
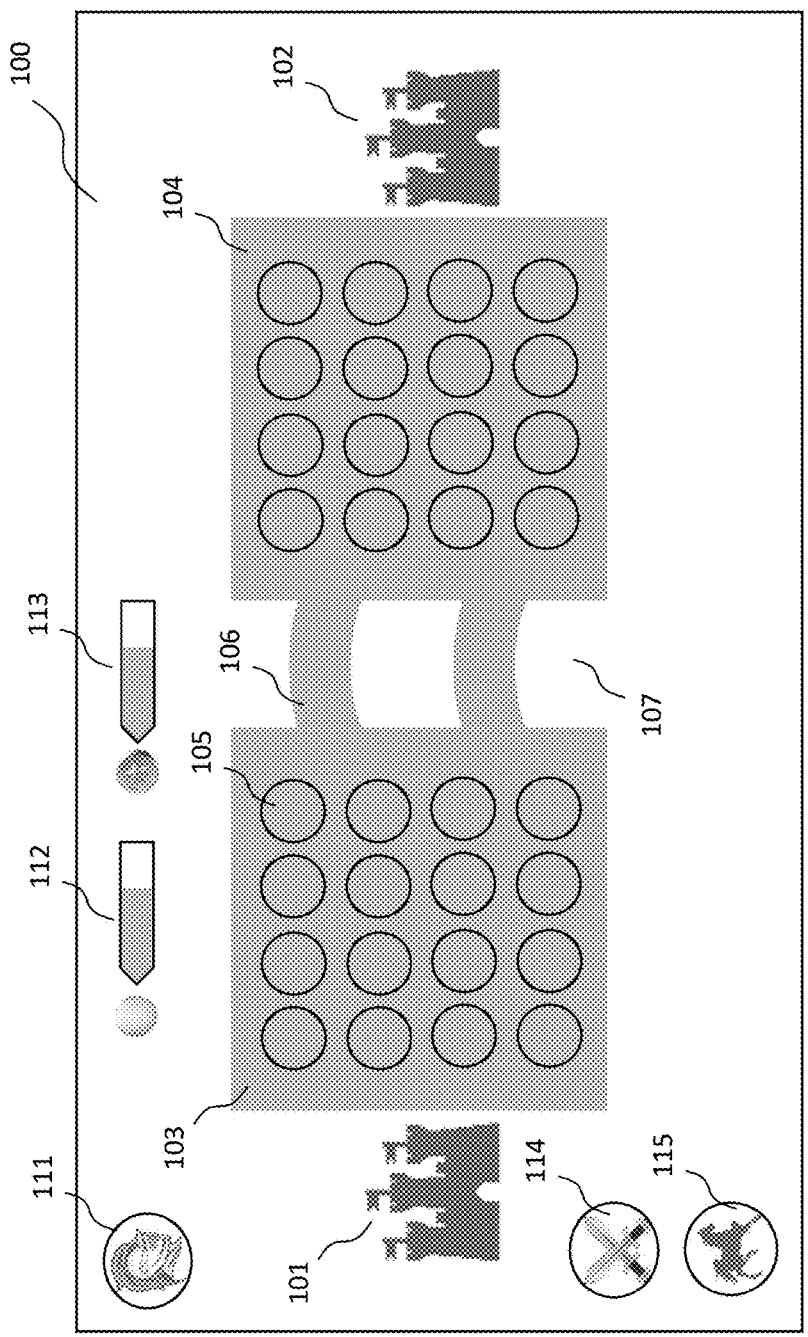
FIG. 1A-1C illustrate user interfaces including battle grounds and stationary units deployed by a player.

The technology described herein, in some embodiments, relates to a strategy video game the combines elements from collectable card games and tower defense and can be played between two or more players in real time.

In a tower defense game, in some embodiments, a player is tasked to protect a home base with the help of different stationary units which the player can deploy at various locations on or around the paths to the home base. The "home base" (also referred to as a "host base" or an "opponent base" depending on the context and player) can take any form, such as a tower, a castle, a city, a country, a home, a tomb, or simply an area. A path is typically a path on the ground, but can also be path in the sky, in the water, or in the space, without limitation. There are typically multiple paths to the host base and thus the host player is required to protect all the paths through which the opponent can reach the host player's home base.

The selection and positioning of the stationary units can be an important strategy of the game. In some embodiments, the selection and positioning are completed prior to the start of a battle and once the battle has started, none of the stationary units can be moved and new stationary units cannot be added. In some embodiments, after the battle has started, existing stationary units cannot be moved but new stationary units can be added.

In addition to the stationary units, in some embodiments, a player can further deploy attacking units that can attack the opponent's attacking units to relieve the burden of the defense team, and/or attack and hopefully destroy the opponent's home base to win the battle. In some embodiments, once an attacking unit is deployed, preferably placed at a desired position by the player, the attacking unit starts to move towards a target opponent item, e.g., an opponent stationary unit or home base. In some embodiments, the player can enter into a garrisoning mode which allows all attacking units to-be-deployed to be completely selected and positioned before any of them starts to move. Therefore, in certain embodiments of the present technology, the gameplay allows formations of both defense teams, which are composed of stationary units, and offense teams, which are comprised of attacking units capable of moving but not initiating moving until the entire offense team is assembled. Use of the defense team can be understood as a "positional defense" game play strategy, which encourages forecasting, risk-taking, and increases unpredictability and fun.

In some embodiments, during a battle, the player can move any stationary unit or attacking unit to a suitable position. However, in a preferred embodiment, once a battle has started, no stationary unit can be moved; likewise, in some embodiments, once an attacking unit starts to move, its actions can no longer be controlled by the player. In this aspect, it is apparent that the selection and positioning of the defense and offense teams are an important strategy of the game.

FIG. 1A illustrates a user interface 100 displayed on a computing device which serves as an interface for a player to create and engage in a game of one embodiment of the present disclosure. On the interface, a battle ground is shown that includes at least a host base, castle 101, a host territory 103, an opponent base, castle 102, and an opponent territory 104. In addition, two bridges 106 serve as the only paths connecting the host territory and the opponent territory. The battle ground also includes areas 107 where ground units cannot occupy or pass through, but flying units may. Also not as shown, there may be units that stay or moves under or through water which may stay at or pass through these areas.

As explained above, a host base is a point of protection by the host team and a target of attack by the opponent. The host base can take any form, such as a tower, a castle, a city, a country, a home, a tomb, or simply an area. Taking a castle as an example, the host base can have a defense strength and a total point of life which, when comes down to zero, will lead to destruction or seizure of the host base by the opponent. In some embodiments, the player can also place a defensive or offensive unit at the host base, increasing its protection against intruders.

"Host territory" and "opponent territory" are relative terms and do not have to be a particular location on the battle ground, can be separate or alternatively overlapping. In FIG. 1A, the host territory 103 (home to the present player) is close to the host base 101 and is separate from the opponent territory 104. The territories as illustrated here are separate but, in some embodiments, can be overlapping, so long as that the host territory is understood to include all areas where the host player is allowed to deploy a stationary unit. By the same token, an opponent territory is where the opponent is allowed to place a stationary unit, in particular prior to the start of a battle.

In some embodiments, the host territory and the opponent territory are not directly connected and thus one or more paths are included to connect them, as illustrated in FIG. 1A. Therefore, two bridges 106 connect the two territories and provide the only paths for any ground unit to reach one territory from the other. A "ground unit," as used herein, denotes a unit by any of the players that moves or travels on the ground only throughout, or on the ground only under a particular circumstances. In other words, a unit that is not a ground unit (e.g., a flying unit) can still reach the opponent's side when the bridges are blocked or otherwise unavailable. In some embodiments, however, all units employed in the game are ground units at all times. In some embodiments, at least one or two or more types of attacking units are not ground units.

Also referring to FIG. 1A, the interface 100 further includes menu, button, and information icons. One example is a player avatar 111. For instance, when the player clicks on or touches the avatar, the player will be able to view information about the role of the player plays in the game, such as experience level, and user preference, without limitation. Info icons 112 and 113, in this example, displays certain important information about the game (e.g., remaining points of life and collection of gold, respectively).

Figure 2A:
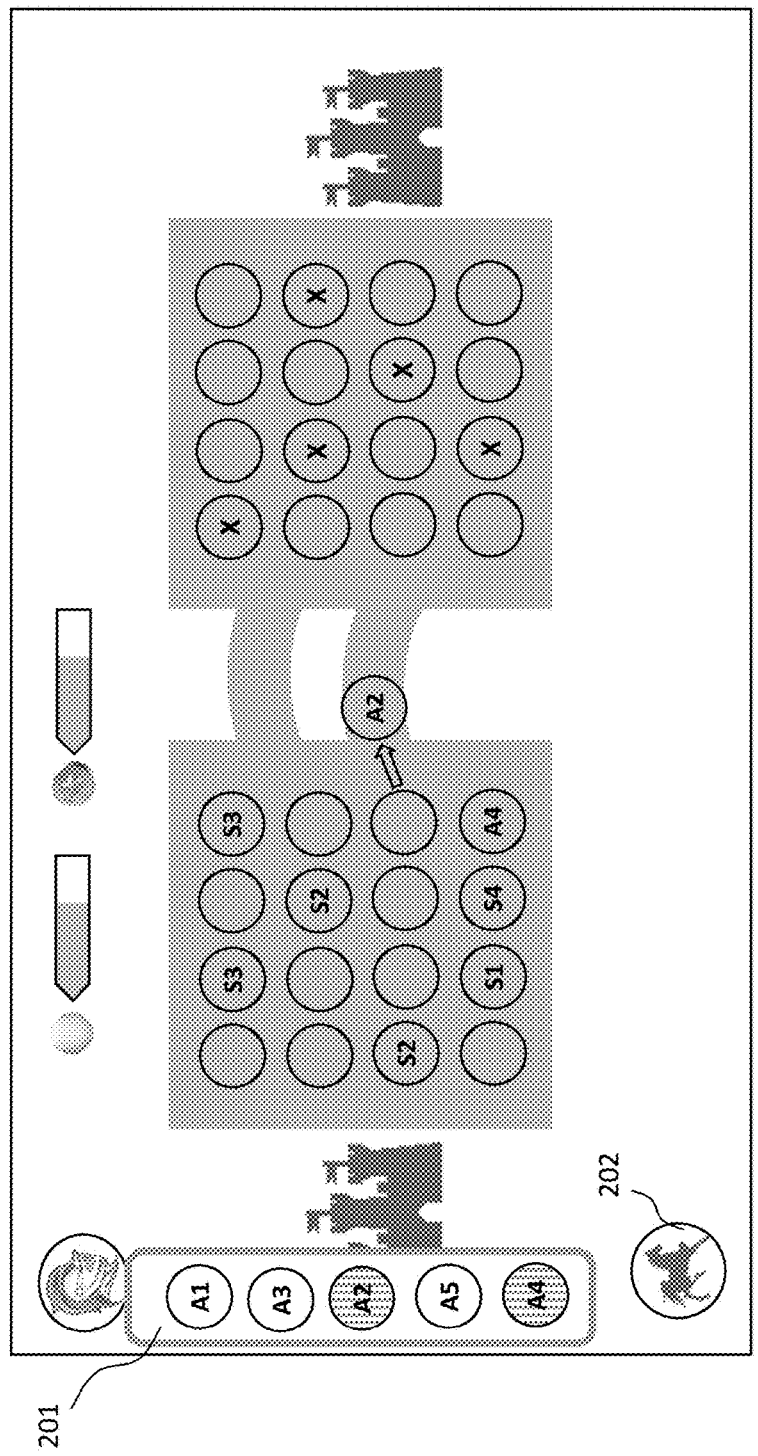
FIG. 2A-2D illustrate the deployment of attacking units on the battle ground by a player, and the movement of attacking units and a chief unit.
Figure 2B:
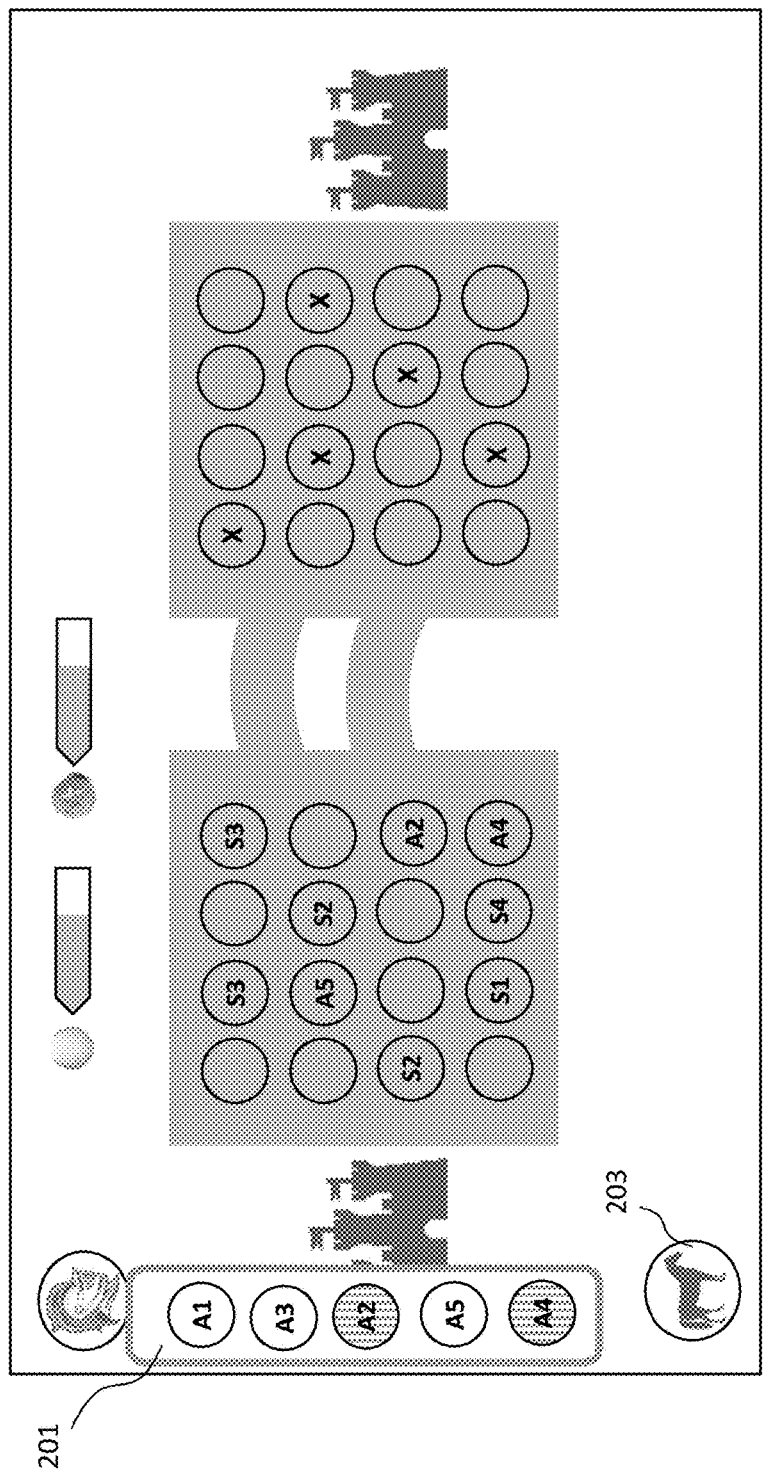

Another example button is the game room icon 114, which provides an entry to a "game room" where a player can choose one or more other players to play a game with. The details of the optional game room are further described below. Yet another button illustrated in FIG. 1A is 115, which allows the player to switch between a garrisoning mode (as shown in FIG. 2B) and a moving mode (as shown in FIG. 1A).

It is noted that the interface can be adjusted, e.g., zoomed in, zoomed out, or shifted, based on player command or automatically to optimize user experience. Therefore, under certain circumstances, not all of the territories, bases and menu items are shown.

Assembly of Defense Team of Stationary Units

Figure 1B:
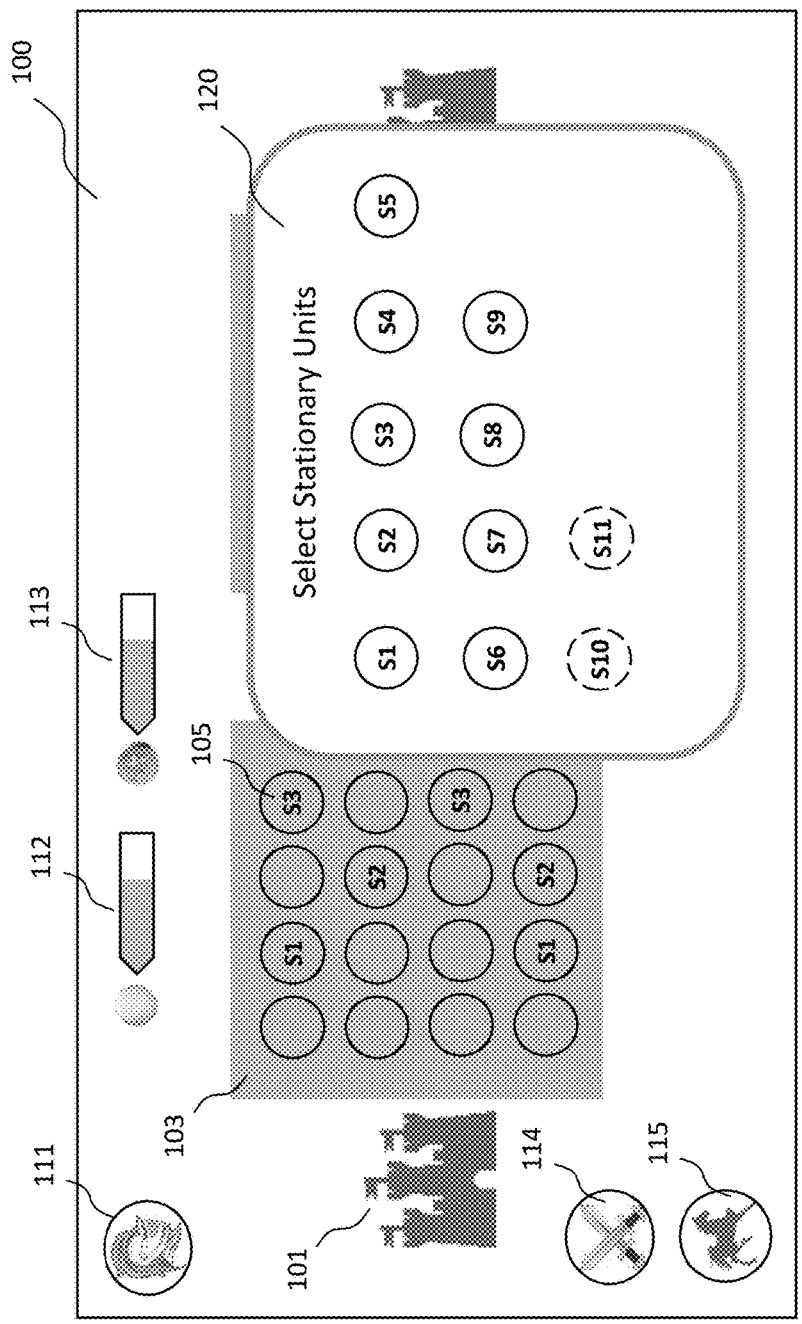

Prior to starting a battle with an opponent, in some embodiments, a player is allowed to select and position one or more stationary units in the player's own territory (e.g., 103). In some embodiments, the stationary units can only be deployed at fixed locations, such as within or on the circles 105. FIG. 1B illustrates a player's placement of six stationary units, two S1, two S2 and two S3, in host territory 103. In some embodiments, the player is not able to see what stationary units have been deployed by the opponent. In some embodiments, the player can at least get limited information, such as which spots have been occupied, from the opponent.

A "stationary unit" as used herein refers to an item (or unit) that can be deployed by a player in a territory which is useful for blocking, attacking, or in any way obstructing the movement or attack of an opponent, whereas the item itself does not move on its own once deployed. In some embodiments, the stationary unit cannot be re-deployed by the player once a battle has started. In some embodiments, even though the stationary unit cannot move on its own, it can be moved or re-deployed by the player at any time or at certain time under limited circumstances (e.g., when the player enters into a moving mode).

Interfaces are also provided for the player to view and select stationary units, illustrated as 120. On interface 120, a listing of stationary units, S1-S9, are presented for the player's selection. The player can view the properties of the units and select as needed. In addition, two units, S11 and S12, are presented in dotted circles, indicating that they can be potentially used if the player qualifies, but at the moment these units are not available.

S1, S2 and S3 symbolize different stationary units. Non-limiting examples of stationary units are provided herein. For example, a first type of stationary unit is a road barrier, such as a wood barrel, which has certain "hit points" but has no attacking ability. Another example of a road barrier is a rock, which may have higher hit points than the wood barrel but costs more to own or replenish.

A second type of stationary unit is a short-range projectile launcher, such as an archery tower, which can launch a relatively short ranged projectile (e.g., arrows) to damage an opponent's unit. The short-range projectile launcher's attacking capability can be defined as "damage", and limited by a "attacking range." Like the road barrier, the short-range projectile launcher also has hit points which, when reduced to zero, lead to destruction or elimination of the unit from the territory.

A third type of stationary unit is a long-range projectile launcher. Different from the short-range projectile launcher, the long-range ones (e.g., a cannon) can launch projectiles like shells to a longer distance. Like the short-range ones, the long-range projectile launchers can also have damage points and hit points.

Yet a fourth type of stationary unit is fast-acting attacking tower, such as an electric tower which can emit electric shocks to nearby units. Such units may have a limited range and cause limited per shock, but due to its fact-acting property, can be an effective tool to have. A fifth type of stationary unit is a magic tower which may not launch a projectile but can emit magic potions or invisible power to damage nearby opponents.

Figure 1C:
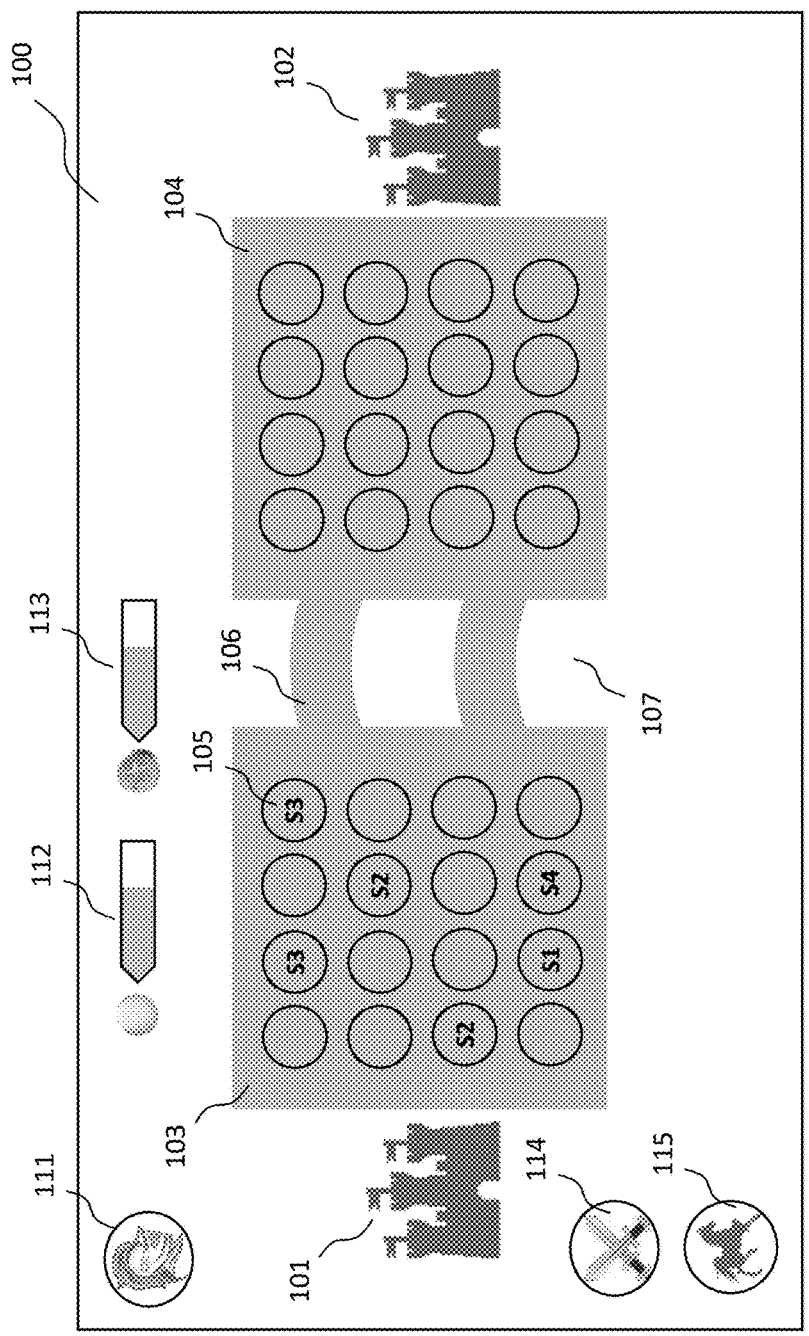

Depending on the different properties of each stationary units, such as costs, hit points, damages, and ranges, the player can select and deploy them in the host territory to deter and obstruct the attacks by the opponent's attacking units and to protect the host base. Before a battle starts, in some embodiments, the player can reposition, remove or add any stationary units in the host territory. For example, see the changes of stationary units from FIG. 1B to FIG. 1C.

In some embodiments, the player is also allowed, or alternatively required, to deploy a unit at the host base (unit not shown) as additional protection to the host base.

Offense Team, and Garrisoning and Moving Modes

In a simple example of a one-on-one battle, when a host player and the opponent both have completed deployment of stationary units, a battle can start with start signals from both players. Once the battle starts, each player will be able to see the units the opponent placed on the battle ground (e.g., X's from the opponents as illustrated in FIG. 2A), if they were not visible earlier. During the battle, each player will be able to select attacking units and deploy them on the battle ground.

An "attacking unit" as used here refers to a unit or item that a player can deploy on a battle ground that can move on its own based on predetermined rules. For instance, an attacking unit can be in an automated mode to move towards the opponent's base, to attack any opponent units en route to the opponent's base, or approach and attach any opponent's units that are attacking a friendly unit, e.g., a unit of the player or an ally. In some embodiments, all attacking units are ground units. In some embodiments, the attacking units which can be used by a player include both ground units and flying units. A flying unit can refer to a unit that may be stationary on the ground but can also move above the ground and in some embodiments not bounded by a particular path or blocked by any ground units. Nevertheless, in some embodiments, a flying unit can still attack a ground unit and be attacked by a ground unit.

In some embodiments, selection of an attacking unit is made from a listing of available units. In some embodiments, a player has the option to decide, prior to the start of the battle, to select a limited number of attacking units to be available for use during the battle. In an alternative embodiment, all available attacking units can be used during a battle. The listing of attacking units available for use during the battle can be displayed on an interface 201, for instance (FIG. 2A). Here, attacking units A2 and A4 are selected by the player and deployed in the host territory. It is to be understood, however, that at least in some embodiments, the attacking units may be positioned at locations outside of the host territory.

In some implementations, once an attacking unit is deployed, the attacking unit is allowed to move as it is designed to. For instance, as illustrated in FIG. 2A, attacking unit A2 is already moving onto one of the bridges towards to the opponent's base. This implementation can be useful as the deployed unit can participate in a battle instantly. Sometimes, the player may prefer to form an attacking team with a desired organization as such organization can be more effective in offense and/or defense.

Accordingly, in one embodiment, the present technology provides each player an option to switch between a garrisoning mode and a moving mode. In the "moving mode," which is illustrated in FIG. 2A and indicated with a galloping horse icon 202, any attacking unit that has been deployed instantly enter into an autonomous mode, without regard to the player's potential deployment of other units.

In the "garrisoning mode," which is illustrated in FIG. 2B and indicated with a standing horse icon 203, all attacking units on the ground, or any attacking units that are deployed on the ground since the garrisoning mode is on, must stay stationary. In FIG. 2B, after A2 is deployed, the player still has time to deploy attacking units A4 and A5. Until the player switches from the garrisoning mode to a moving mode, none of A2, A4 or A5 will move. As noted above, however, all of the stationary units, albeit not moving, can still attack nearby opponent units within range. In some embodiments, for the benefit of the side that enters into the garrisoning mode, the system halts the opponent's ability to attack.

In some embodiments, once an attacking unit is deployed, the icon of that unit on interface 201 will turn gray, indicating that a new unit is being prepared for further deployment. In some embodiments, the preparation of each unit is independent of other units. In some embodiments, regeneration of the units depends the overall supply or resource (including time) and thus is coordinated. Therefore, when the resource runs out, none of the attacking units will be available for deployment. For instance, the game may employ a magic potion well and a magic potion tower, where the magic potion well generates (and regenerates) magic potion at a certain pace and the magic potion tower is useful for storing the magic potion. A player will not be able to deploy any attacking unit without sufficient magic potion, but the magic tower can only store a maximum amount of magic potion. In another embodiment, after each deployment, each unit will have a cool-down time, during which the unit's card will gray out and the unit cannot be deployed. Therefore, the player will need to strategize on the deployment so that no magic potion is wasted and at the same time leave sufficient magic potion for emergent use.

Figure 2C:
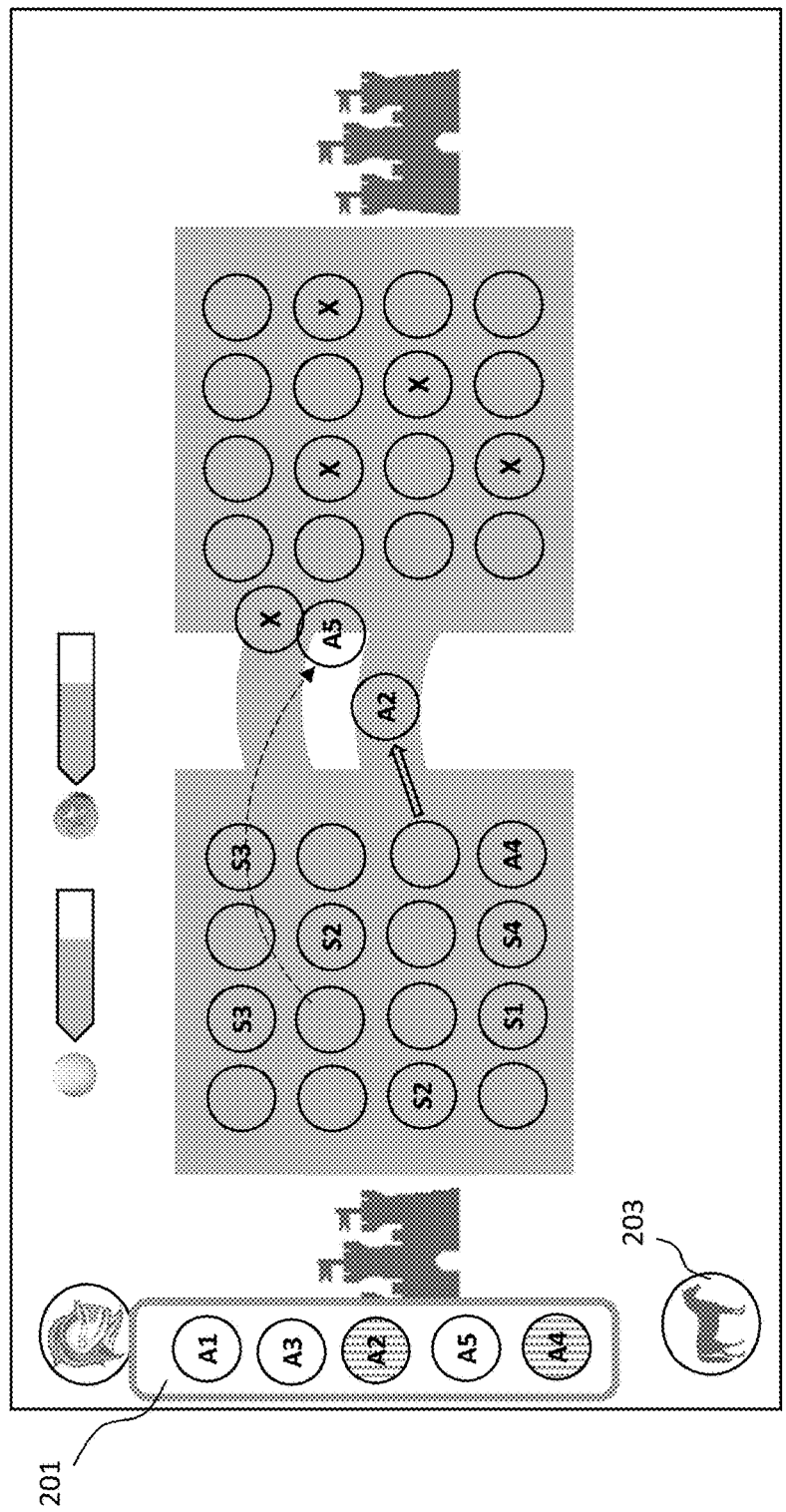

Upon completion of the attacking team (e.g., with a signal from the player), or entering into the moving mode, the attacking units will carry out their predetermined missions. As illustrated in FIG. 2C, A2 moves, on the ground, onto one of the bridges and A5, a flying unit, flies over to the opponent's territory and confront a unit from the opponent.

During a battle, in some embodiment, a player can apply certain special power to its units and/or the opponent's units. In one example, a player can choose to increase the damage point of one or more of its attacking and/or stationary units. In this example, perhaps the application is limited by time or number. In another example, once a benefit or harm is applied to one player's units, it is applied to the opponent in the same manner. For instance, a player can apply a magic to double all of its units' damage points for 5 seconds, and the same increase is applied to the opponent's units as well. In another example, a player can reduce the moving speed of all of the attacking units, whether they belong to the player or its opponent.

Chief Unit

In some embodiments, for each player, in addition to the stationary units and the attacking units, there is also a chief unit (or two or three chief units). In some embodiments, there is no replenishment for the chief unit(s). In other words, once a chief unit is deployed, the same unit cannot be deployed again. In some embodiments, the chief unit is the only unit of the play that can be moved by the player in a moving mode after the unit is deployed.

Figure 2D:
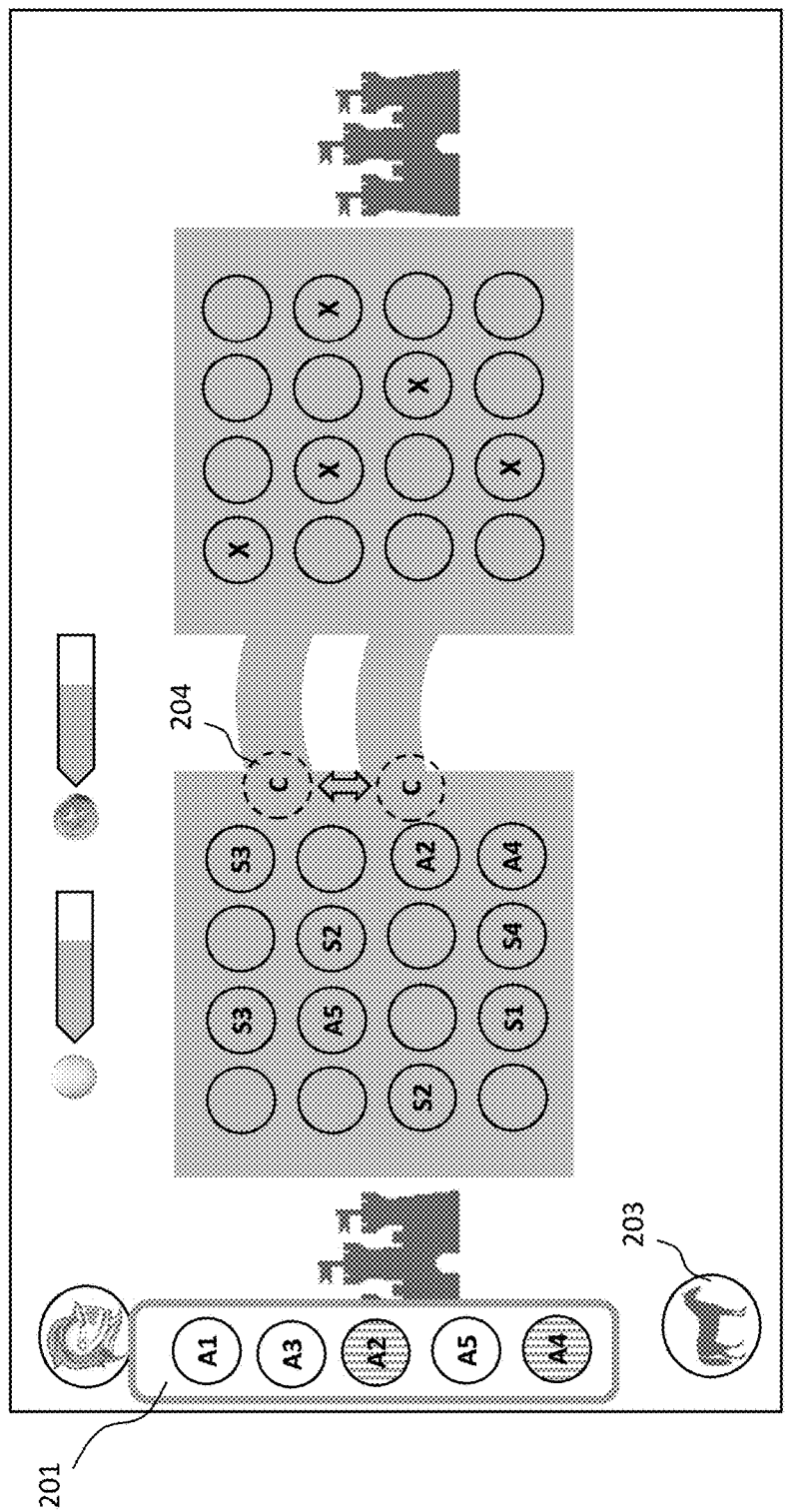

With reference to FIG. 2D, a chief unit 204 is deployed on the ground. At any time during the game, the chief unit can be moved (repositioned) by the player, making the chief unit is uniquely useful unit for the player. By contrast, in some embodiments, once an attacking unit is deployed and enters into a moving mode, the attacking unit cannot be moved by the player. In some embodiments, like the attacking units, the chief unit can move on its own. In some embodiments, like the stationary units, the chief unit defends its surrounding with stationary skills, e.g., archery.

Multiplayer Gameplay

In some embodiments, the present disclosure further describes systems and methods for multiple-player gameplay, such as 2 vs. 2, 3 vs. 3, and 4 vs. 4. In one embodiment, prior art deployment of stationary units, the player can enter a "game room" (see button 114 on FIG. 1A), where the player can invite other players (or wait for others) to join the game. An illustrative game room is shown as 300 in FIG. 3A, wherein the player can choose to let other player freely (303) choose team membership, or generate teams randomly (302). Potential allies will be shown in the left column and potential opponents will show up in column to the right, in each cell 301. Once all players confirm the arrangement, the player (You) has the option to enter another interface for building the alliance (button 304). At any point, each player can choose to leave to change team, in some embodiments.

Upon entering into the Alliance interface 310, in some embodiments, each player will be able to see the avatar (311) of the other players in the alliance, where the main/lead player is indicated (e.g., with the star 314). At this interface, in some embodiments, the player can choose to change the lead role, e.g., by clicking on button 315 to ask to give up the lead role or request the lead role.

The lead player of each team can have significance, in some implementations. In some embodiments, the victory or loss depends on the destruction of the base of the lead player alone, and thus the other players of the ally need not build, deploy or display its own base. In some embodiments, however, the bases of all of the ally members will be part of the game and an ally loses only when all of the bases are destroyed.

Figure 3A:
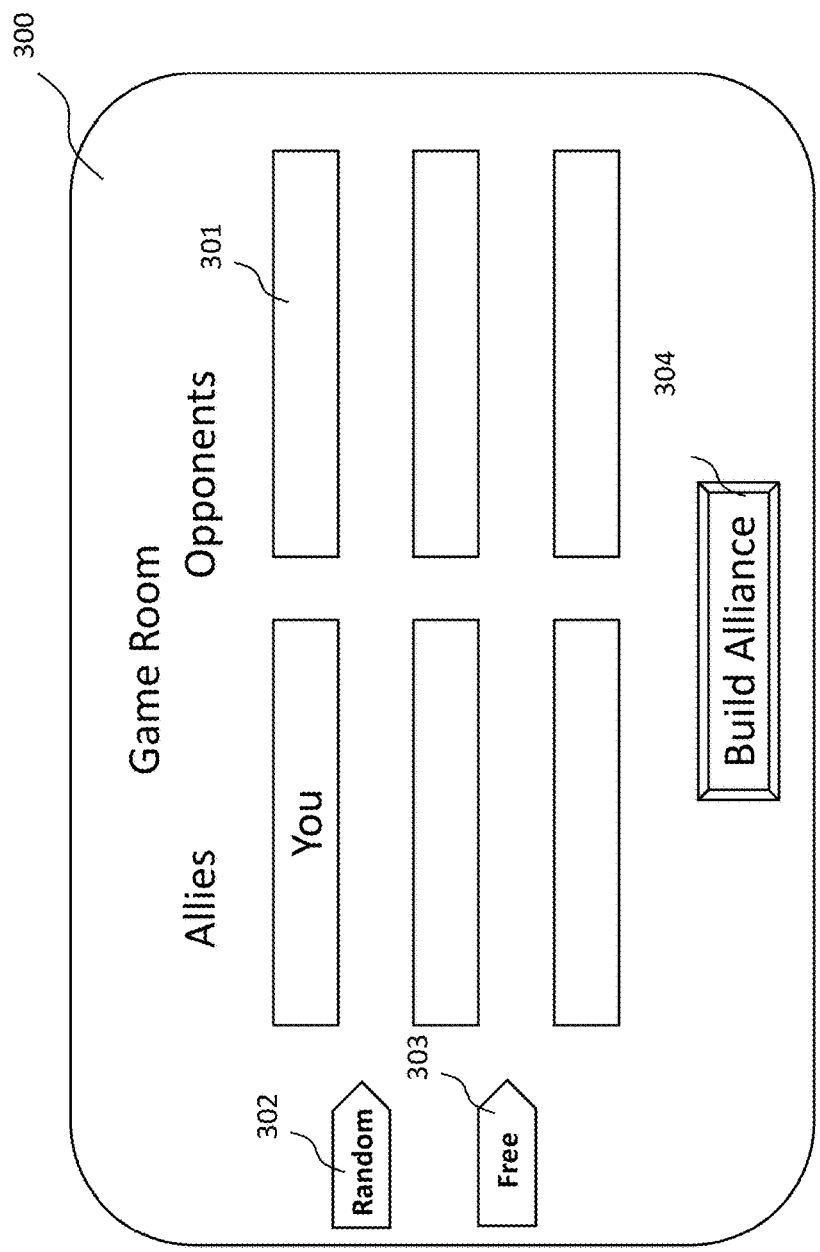
FIG. 3A-3C illustrate user interfaces and work flow for entering into a multiplayer battle.
Figure 3B:
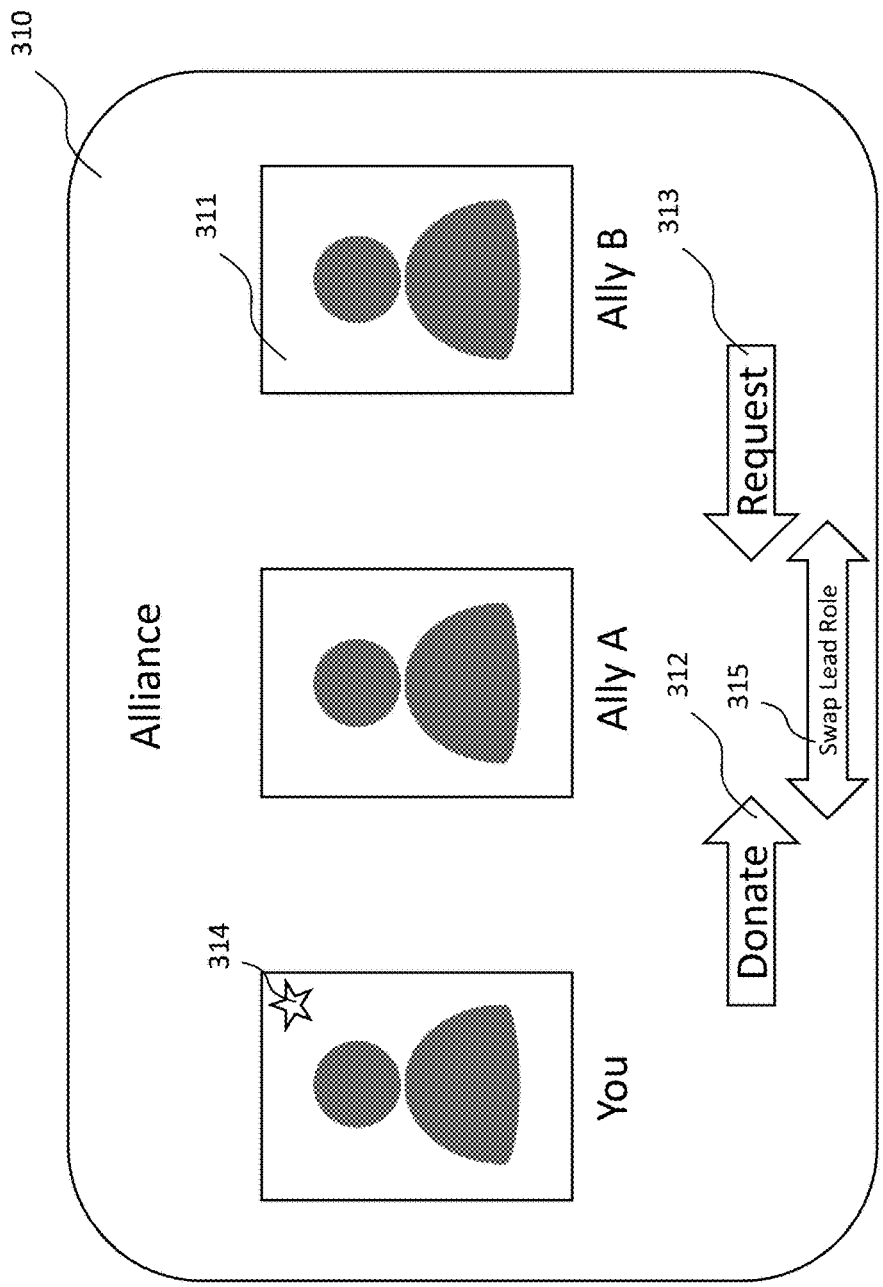

Another example function on interface 310 of FIG. 3A enable a player to donate (312) resource (e.g., magic potion, gold, or spell) or units to another player. A higher-leveled player, for instance, may be enabled to donate an attacking unit to a lower-leveled play in the ally as the lower-leveled play has not been qualified to obtain that unit or elected earlier to obtain a different type of unit. Likewise, a player can request (313) certain recourses or units from another player in the ally.

Figure 3C:
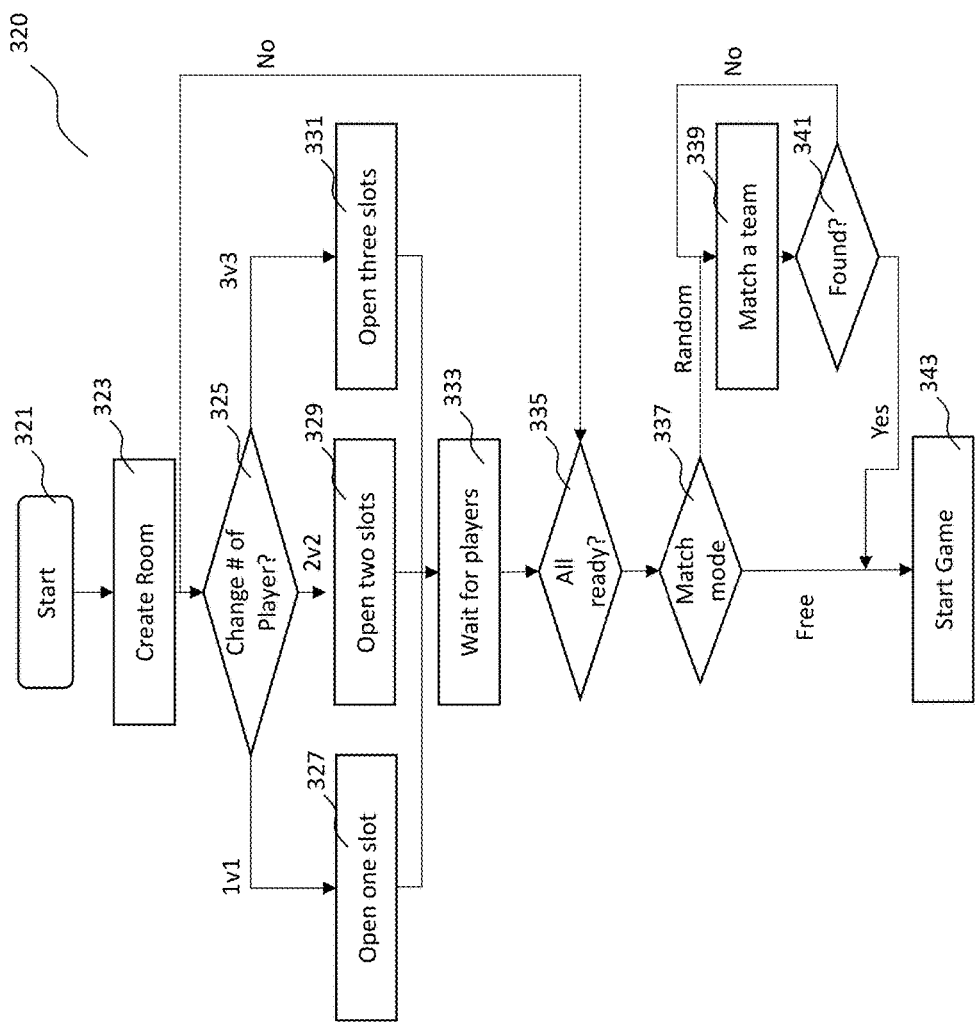

The flow chart 320 of FIG. 3C illustrates one embodiment of the multiplayer game play in a different manner. When a system receives a request to start (321) a new game, the system creates a virtual game room (323), preferably on the server. The system then provides an option to the player, via an interface displayed on a personal computing device of the player, for choosing number of players in the game. The player can take the option (325) and informs the system that a 1 vs. 1, 2 vs. 2, or 3 vs. 3 game is desired. Accordingly, the system creates a game room that make available one available slot (327) for each side, or two slots (329), or three slots (331). It also means that either one, or three, or five players need to join the game (beside the host player).

Once a game room of appropriate size is created, the player will need to wait for or invite other plays to join (333). When enough numbers have joined, alliance and opponent teams can be built (337). One option is allow each player freely choose membership and another option is to randomly assign players to teams (steps 339 and 341) until all team membership positions are taken. In some embodiments, under the random mode, a player may not be notified who the opponent(s) are, as they are assigned by the system, until the battle starts. When the system picks the opponents, the system may consider the level of the other players, their availability, among other factors.

Once the alliance is built, the players can enter into a battle ground, which may look like the interface 100 in FIG. 1A. In some embodiments, only one home base is included, from the lead player of each team. The alliance members, however, can deploy stationary, in particular attacking units to the battle ground for battles. In some embodiments, each player, through their own computing devices, views the same battle ground and fighting units, but with different menus, icons, and resources. In some embodiments, all members of a team can share resources live. For instance, they can share the magic potion, gold, or available spells. A victory is declared when one of the two bases is destroyed or captured.

Systems, Modules and Workflows

Figure 4:
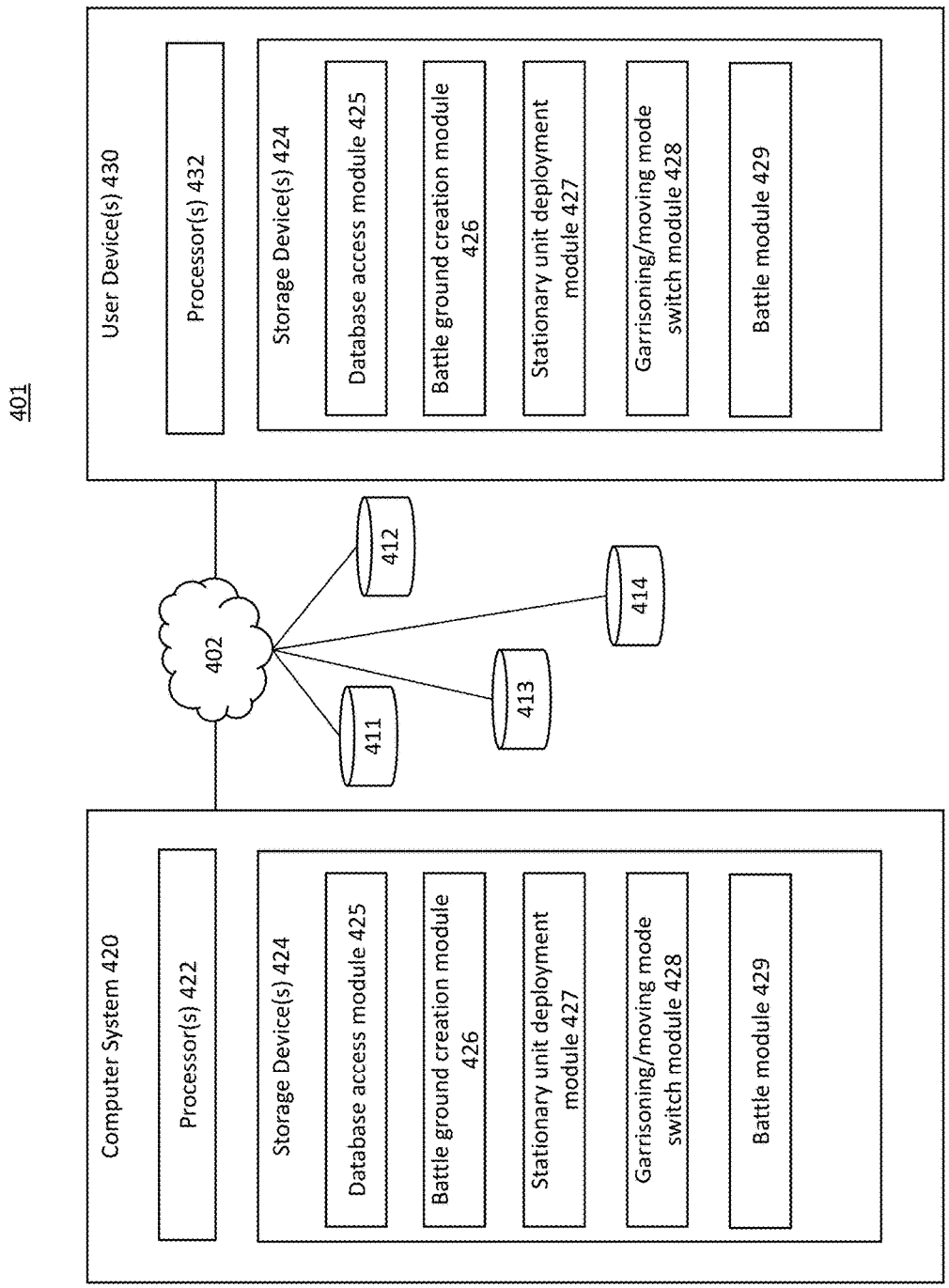
FIG. 4 illustrates an example environment for creating and enabling a battle between different player over a computer network.

FIG. 4 depicts an example environment 401 for facilitating generation of a battle ground and enabling a gameplay between two or more players. In one implementation, the environment 401 may include one or more of a computer system 420, a user device 430, a battle ground and map data source 411, a stationary and attacking units data source 412, a player profile data source 413, and a resource data source 414, in communication via network 402, and/or other components. The data sources 411-313 are illustrated in FIG. 4 as being separate from the computer system 420 and the user device 430. In some implementations, some or all of the data sources 411-414 may be stored on computer system 420, user device 430, and/or at a remote location. In some implementations, the data sources 411-414 may be stored in the same location and/or may be stored in the same database. As illustrated in FIG. 4, each of the software modules may be in operation on user device 430 and/or on computer system 420. Various aspects of the gaming system may operate on computer system 420 and/or on one or more user devices 430. That is, the various software modules described herein may each operate on one or both of computer system 420 and/or user device 430.

The data sources 411-414 may be computer memories configured to store data. Further, the data sources 411-414 may store data formatted according to object based data structures as described above. In some embodiments, the battle ground and map data source 411 may store data for constructing a battle ground that includes host territories and opponent territories for unit deployment and battle. In some embodiments, the stationary and attacking units data source 412 stores information about each stationary and attacking unit, its properties, and required qualifications. In some embodiments, the player profile data source 413 stores information about each player that has played the game, the play history, user preference, and/or qualification level. In some embodiments, the resource data source 414 stores information about various resources available to players, such as types of wells, mines, financial resources, magic spells, and skills, without limitation.

The computer system 420 may be configured as a server (e.g., having one or more server blades, processors, etc.), a personal computer (e.g., a desktop computer, a laptop computer, etc.), a smartphone, a tablet computing device, and/or other computing device that can be programmed to receive tabular data or object based data, provide services for the manipulation of the data, and provide services for transformation and display of the data.

Figure 6:
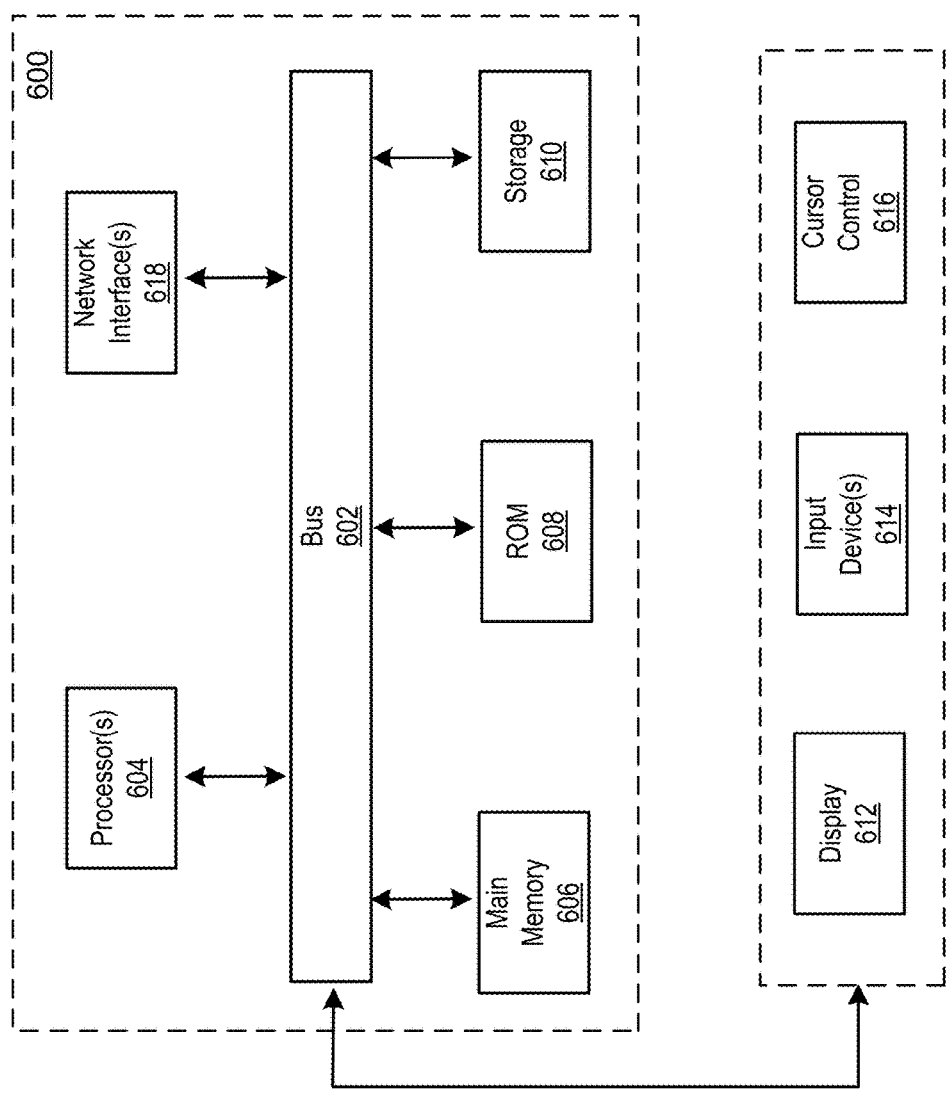
FIG. 6 illustrates a block diagram of an example computer system in which any of the implementations described herein may be implemented.

The computer system 420 may include one or more processors 422, one or more storage devices 424, and/or other components. Processors 422 may be programmed by one or more computer program instructions stored on storage device 424. For example, processors 422 may be programmed by database access module 425, battle ground creation module 426, stationary unit deployment module 427, garrisoning/moving mode switch module 428, battle module 429, and/or other instructions that program computer system 420 to perform various operations, each of which are described in greater detail herein. As used herein, for convenience, the various instruction modules, systems, and engines will be described as performing an operation, when, in fact, the various instructions program the processors 422 (and therefore computer system 420) to perform the operation. Further details and features of a computer system 420 configured for implementing features of the described technology may be understood with respect to computer system 600 as illustrated in FIG. 6.

User device(s) 430 may be configured as a server (e.g., having one or more server blades, processors, etc.), a personal computer (e.g., a desktop computer, a laptop computer, etc.), a smartphone, a tablet computing device, and/or other device that can be programmed to receive tabular data or object based data, provide services for the manipulation of the data, and provide services for transformation and display of the data. In some embodiments, two or more user devices are included, each of which is connected to one another or to the computer system 420 over a network.

User device 430 may include one or more processors 432, one or more storage devices 424, and/or other components. Processors 424 may be programmed by one or more computer program instructions. For example, processors 422 may be programmed by database access module 425, battle ground creation module 426, stationary unit deployment module 427, garrisoning/moving mode switch module 428, battle module 429, and/or other instructions that program computer system 420 to perform various operations, each of which are described in greater detail herein. As used herein, for convenience, the various instruction modules, systems, and engines will be described as performing an operation, when, in fact, the various instructions program the processors 422 (and therefore computer system 420) to perform the operation.

In various implementations, the database access module 425 may be a software module operating on computer system 420 and/or user device 430. Database access module 425 may be configured to provide system access to data sources, e.g., the data sources 411-414. Database access module 425 may be configured to read and write to data sources 411-414, as well as carry out searches, queries, and any other database functionality required by computer system 420 and/or user device 430.

Figure 5:
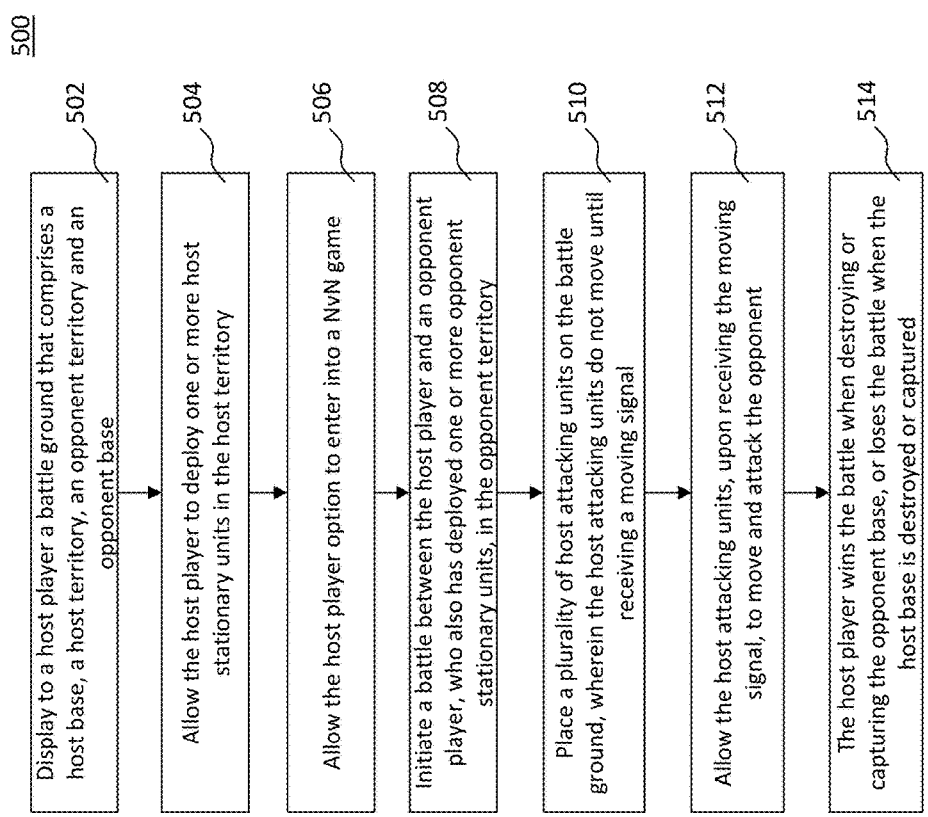
FIG. 5 illustrates an example process flow chart of a method, according to some implementations.

FIG. 5 depicts a process flow chart of a method 500 for generating and conducting an interactive gameplay over a networked computer system. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

At step 502, pursuant to a user command, the system, such as personal computing device, displays a battle ground on a user interface presented for a host player. In some embodiments, the battle ground comprises a host base, a host territory, an opponent territory and an opponent base. At step 504, the interface allows the host player to deploy one or more host stationary units in the host territory. In some embodiments, the host player is able to take an multi-player option (step 506) and invite three or more players to join a N versus N (NvV) game. In one embodiment, only one other play enters the game, which then includes just one host player and one opponent.

In some embodiments, the system then initiates a real-time (contrary to turn-based games, in some embodiments) battle between the host player and an opponent player, wherein the opponent player has deployed one or more opponent stationary units in the opponent territory (step 508).

In some embodiments, the system places, in response to a command from the host player, a plurality of host attacking units on the battle ground, wherein the host attacking units do not move until receiving a moving signal (step 510). The moving signal can be a command from the host player, or alternatively the ending of a preset time period or some other types of timeout.

At step 512, upon receiving the moving signal, each of the attacking units is allowed to move and attack the opponent, e.g., one or more of the opponent stationary units, one or more of opponent attacking units deployed by the opponent player, or the opponent base (step 514).

In some embodiments, the system can switch between a garrisoning mode and a moving mode. In the garrisoning mode, in one embodiment, all attacking units of the host player are not allowed to move in the host garrisoning mode. In another embodiment, in the garrisoning mode, only those attacking units of the host player that are deployed after entry into the garrisoning mode are not allowed to move in the host garrisoning mode. In some embodiments, upon receiving the moving signal, the system enters into the moving mode, in which every attacking unit is allowed to move. In some embodiments, at least two, or alternatively at least three host stationary units are deployed to form a defense team, prior to start of the battle. In some embodiments, at least two of the deployed stationary units are of different types.

In some embodiments, the system imposes certain limitations to the gameplay. For instance, in one implementation, once a defense team (stationary units deployed to form a team) or an offense team (attacking units deployed to form a team) is deployed, the player can no longer move any of the units. In some embodiments, the player is only allowed to move the attacking units in a garrisoning mode, prior to completion of formation of the offense team and before any of the attacking units starts to move. In some embodiments, the player is not allowed to deploy additional stationary units once a battle starts. In some embodiments, the player is not allowed to move any attacking unit in the moving mode. In some embodiments, the player is not allowed to move any attacking unit except between the deployment of the attacking unit during a garrisoning mode and the switch over to the moving mode.

In some embodiments, before the initiation of the battle, the player is allowed to choose more than one player to join the battle. In some embodiments, the players are divided into a host team and an opponent team. Within a team, in some embodiments, players are presented user interfaces for transferring resource, stationary units, or attacking units.

In some embodiments, players on the same team are allowed to designate a lead player, or switch roles as the lead player. In some embodiments, only the designated lead from each team has a host base during the battle. The loss or destruction of the host base, in some embodiments, leads to defeat of the team.

FIG. 6 depicts a block diagram of an example computer system 600 in which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method of conducting a computer-implemented battle between two or more players over a network each operating through a computing device, comprising:
    displaying a battle ground on a user interface presented on a user computing device for a host player, wherein the battle ground comprises a host base, a host territory, an opponent territory and an opponent base;
    allowing the host player to deploy one or more host stationary units in the host territory;
    allowing the host player to deploy a first plurality of host attacking units in the host territory;
    initiating a real-time battle between the host player and an opponent player, wherein the opponent player has deployed one or more opponent stationary units and a plurality of opponent attacking units in the opponent territory;
    entering, in response to a command from the host player, into a host garrisoning mode;
    allowing, during the host garrisoning mode, the host to place a second plurality of host attacking units on the battle ground, wherein according to the host garrisoning mode the first plurality of host attacking units deployed prior to the host garrisoning mode are able to move, while the second plurality of host attacking units deployed during the host garrisoning mode are not able to move while the one or more host stationary units and the first plurality of host attacking units are engaged in the real-time battle, until a moving mode, wherein during the host garrisoning mode, the first and second plurality of host attacking units are allowed to attack and defend regardless of whether they are able to move;

entering, upon receiving a moving signal, into the moving mode; and allowing the second plurality of host attacking units, in the moving mode, to move and engage in the real-time battle, wherein each of the host attacking units is not allowed to be moved by the host player once the host attacking unit has started moving, each of the host attacking units being controlled based on one or more respective predetermined rules once the host attacking unit has started moving, wherein a first host attacking unit of the second plurality of host attacking units is controlled based on one or more first respective predetermined rules, and a second host attacking unit of the second plurality of host attacking units is controlled based on one or more second respective predetermined rules that are different from the one or more first respective predetermined rules.

2. The method of claim 1, wherein the moving signal is a command from the host player.

3. The method of claim 1, wherein the moving signal is ending of a time period.

4. The method of claim 1, wherein at least two host stationary units are deployed.

5. The method of claim 1, wherein none of the host stationary units are allowed to be moved or re-deployed by the host player after the battle is initiated.

6. The method of claim 1, further comprising, prior to initiation of the battle, allowing the host player to choose more than one player to join the battle.

7. The method of claim 6, further comprising allowing the players to be divided into a host team and an opponent team.

8. The method of claim 7, further comprising transferring resource, stationary units, or attacking units between players on the same team.

9. The method of claim 7, further comprising allowing designation or change of a lead player in a team.

10. The method of claim 9, wherein only the lead player from each team has a host base during the battle.

11. A system of conducting a computer-implemented battle between two or more players over a network each operating through a computing device, comprising a processor, memory and program instructions which configure the system to:

display a battle ground on a user interface presented on a user computing device for a host player, wherein the battle ground comprises a host base, a host territory, an opponent territory and an opponent base;

allow the host player to deploy one or more host stationary units in the host territory;

allow the host player to deploy a first plurality of host attacking units in the host territory;

initiate a real-time battle between the host player and an opponent player, wherein the opponent player has deployed one or more opponent stationary units and a plurality of opponent attacking units in the opponent territory;

enter, in response to a command from the host player, a host garrisoning mode;

allow, during the host garrisoning mode, the host to place a second plurality of host attacking units on the battle ground, wherein according to the host garrisoning mode the first plurality of host attacking units deployed prior to the host garrisoning mode are able to move, while the second plurality of host attacking units deployed during the host garrisoning mode are not move while the one or more host stationary units and the first plurality of host attacking units are engaged in the real battle, until a moving mode is entered, wherein during the host garrisoning mode, the first and second plurality of host attacking units are allowed to attack and defend regardless of whether they are able to move;

enter, upon receiving a moving signal, into the moving mode; and allow the second plurality of host attacking units, in the moving mode, to move and engage in the real-time battle, wherein each of the host attacking units is not allowed to be moved by the host player once the host attacking unit has started moving, each of the host attacking units being controlled based on one or more respective predetermined rules once the host attacking unit has started moving, wherein a first host attacking unit of the second plurality of host attacking units is controlled based on one or more first respective predetermined rules, and a second host attacking unit of the second plurality of host attacking units is controlled based on one or more second respective predetermined rules that are different from the one or more first respective predetermined rules.

12. A non-transitory computer-readable medium for conducting a computer-implemented battle between two or more players over a network each operating through a computing device, comprising program instructions which, when executed by a suitably programmed computer, configure the computer to:

display a battle ground on a user interface presented on a user computing device for a host player, wherein the battle ground comprises a host base, a host territory, an opponent territory and an opponent base;

allow the host player to deploy one or more host stationary units in the host territory;

allow the host player to deploy a first plurality of host attacking units in the host territory;

initiate a real-time battle between the host player and an opponent player, wherein the opponent player has deployed one or more opponent stationary units and a plurality of opponent attacking units in the opponent territory;

enter, in response to a command from the host player, a host garrisoning mode;

allow, during the host garrisoning mode, the host to place a second plurality of host attacking units on the battle ground, wherein according to the host garrisoning mode the first plurality of host attacking units deployed prior to the host garrisoning mode are able to move, while the second plurality of host attacking units deployed during the host garrisoning mode are not move while the one or more host stationary units and the first plurality of host attacking units are engaged in the real battle, until a moving mode is entered, wherein during the host garrisoning mode, the first and second plurality of host attacking units are allowed to attack and defend regardless of whether they are able to move;

enter, upon receiving a moving signal, into the moving mode; and allow the second plurality of host attacking units, in the moving mode, to move and engage in the real-time battle, wherein each of the host attacking units is not allowed to be moved by the host player once the host attacking unit has started moving, each of the host attacking units being controlled based on one or more respective predetermined rules once the host attacking unit has started moving, wherein a first host attacking unit of the second plurality of host attacking units is controlled based on one or more first respective predetermined rules, and a second host attacking unit of the second plurality of host attacking units is controlled based on one or more second respective predetermined rules that are different from the one or more first respective predetermined rules.

\* \* \* \* \*